United States Patent Office 3,547,585
Patented Dec. 15, 1970

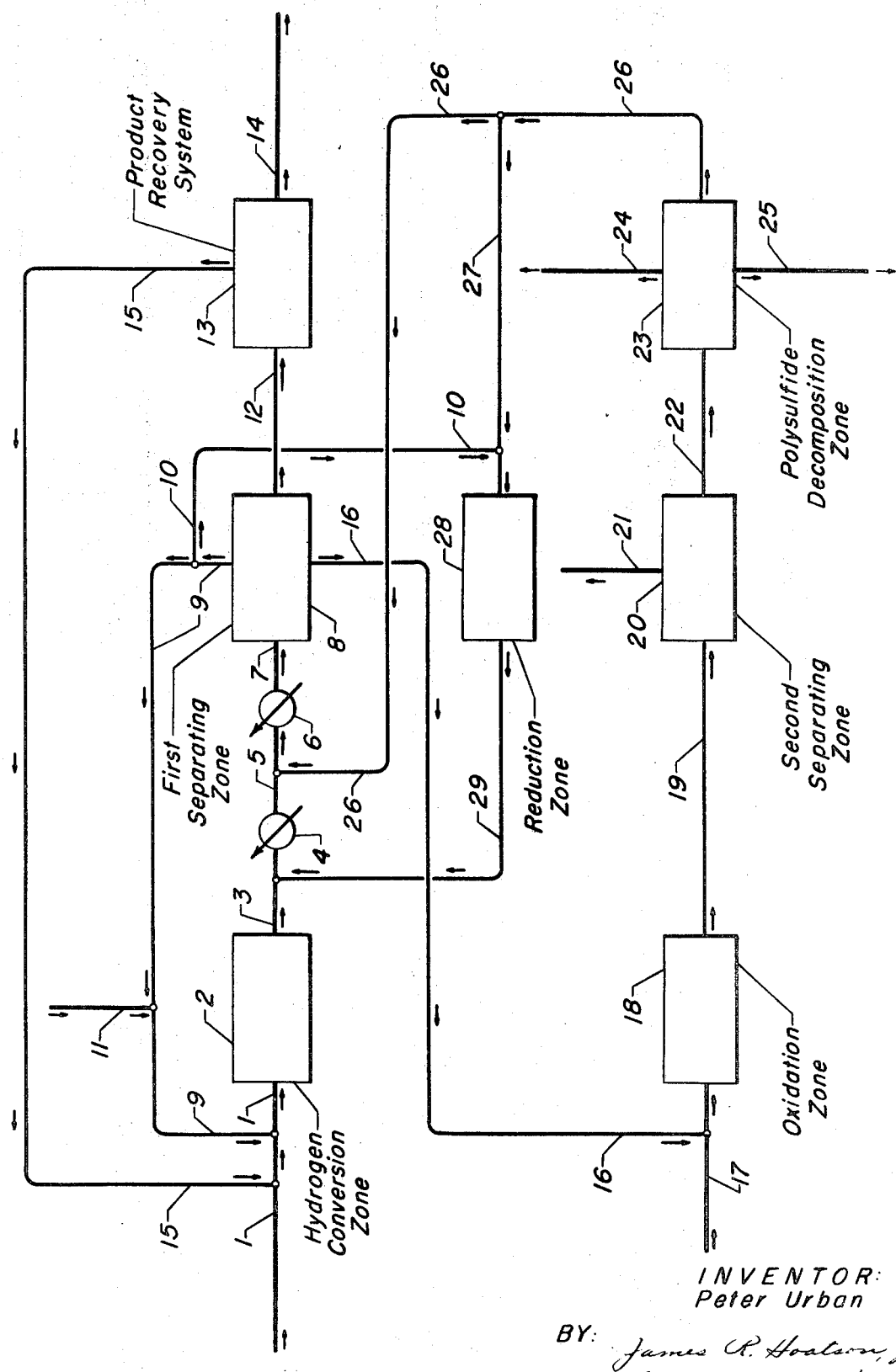

3,547,585
COMBINATION OF A HYDROCARBON CONVERSION PROCESS WITH A WASTE WATER TREATING PROCESS
Peter Urban, Northbrook, Ill., assignor to Universal Oil Products Company, Des Plaines, Ill., a corporation of Delaware
Filed Nov. 26, 1968, Ser. No. 778,970
Int. Cl. C01b *17/04;* C10g *31/08*
U.S. Cl. 23—224                                   10 Claims

ABSTRACT OF THE DISCLOSURE

Hydrocarbons containing sulfurous and nitrogenous contaminants are catalytically converted and the contaminants removed by a two step water wash. The aqueous solution is treated for recovery of sulfur and the water recycled.

---

The subject of the present invention is a combination process directed towards the catalytic conversion of a hydrocarbon charge stock containing sulfurous and nitrogenous contaminants with continuous recovery of at least a portion of the sulfur and ammonia from the products of the hydrocarbon conversion step without causing any substantial water pollution problems in the vicinity of the process, with minimum requirements for fresh water, and with minimum production of a substantially ammonium thiosulfate-free recycle water stream. More precisely, the present invention relates to a combination process for the conversion of hydrocarbon charge stocks containing sulfurous and nitrogenous compounds wherein a waste water stream containing substantial quantities of $NH_3$ and $H_2S$ (typically present as $NH_4HS$) is produced, in a water-contacting step, by contacting a water stream with the effluent stream from the hydrocarbon conversion step. This waste stream is thereafter treated to recover elemental sulfur and to produce a treated water stream containing ammonium thiosulfate, and this treated water stream is typically further treated for the purpose of removing ammonium thiosulfate therefrom before it is recycled to the water-contacting step. The problem addressed by the present invention involves this requirement for a substantially thiosulfate-free water stream for recycle to the water-contacting step and the attendant cost of producing same. The solution embodied in the present invention uses a portion of the thiosulfate-containing water stream for recycle, thereby minimizing the amount of the substantially ammonium thiosulfate-free water stream which must be produced for recycle to the water-contacting step.

The concept of the present invention developed from my efforts directed towards a solution of a substantial water pollution problem that is caused when a water stream is used, in a water-contacting step, to remove ammonium hydrosulfide salts from the hydrocarbon conversion step effluent equipment train associated with such hydrocarbon conversion processes as hydrorefining, hydrocracking, etc., wherein ammonia and hydrogen sulfide side products are produced. The original purpose for injecting the water stream into the effluent train of heat transfer equipment associated with these processes was to remove these detrimental sulfide salts so that the equipment would not clog-up. The waste water stream so-formed presented a substantial pollution hazard insofar as it contains sulfide salts which have a substantial biological oxygen demand and ammonia which is a nutrient that leads to excessive growth of stream vegetation.

One solution commonly used in the prior art to control this pollution problem is to strip a gas stream containing $NH_3$ and $H_2S$ from this waste water stream with resulting recycle of the stripped water to the effluent equipment and with production of sulfur, sulfuric acid, ammonium sulfate, or the like product from the gas stream. Another solution is to sufficiently dilute the waste water stream so that the concentration of sulfide salts is reduced to a level wherein it is relatively innocuous and to discharge the diluted stream into a suitable sewer. Still another approach to the solution to this problem has been directed towards a waste water treatment method which would allow recovery of the commercially valuable elemental sulfur and ammonia directly from this waste water solution by a controlled oxidation method. However, despite careful and exhaustive investigations of alternative methods for direct oxidation of the sulfide salts contained in this waste water stream, it has been determined that an inevitable side product of the oxidation step appears to be ammonium thiosulfate. The presence of ammonium thiosulfate in the treated aqueous stream presents a substantial problem because for efficient control of the water pollution problem and in order to have a minimum requirement for make-up water, it is desired to operate the combination of the hydrocarbon conversion process and the waste water treating process with a closed water loop. That is, it is desired to continuously recycle the treated water stream back to the water-contacting step of the hydrocarbon conversion process in order to remove additional quantities of the detrimental sulfide salts. The presence of ammonium thiosulfate in this treated aqueous stream has heretofore been thought to prevent the direct recycling of this stream back to the water-contacting step primarily because the ammonium thiosulfate can react with hydrogen sulfide contained in the effluent stream from the hydrocarbon conversion step to produce elemental sulfur, with resulting contamination of the hydrocarbon product stream with free sulfur which causes severe corrosion problems in the downstream equipment. In addition, ammonium thiosulfate is non-volatile and can contribute to undersired salt formation in the effluent heat transfer equipment. Heretofore several methods have been proposed for removing the ammonium thiosulfate from the treated water stream thereby enabling operation with a closed water loop. However, all of the proposed solutions have materially increased the costs of the combined process.

I have now found that not all of the water that is recycled to the water-contacting step of the hydrocarbon conversion process must be substantially free of ammonium thiosulfate. More specifically, I have determined an ammonium thiosulfate-containing water stream can be utilized in the portion of the water-contacting step wherein the temperature is not greater than 270° F. Viewed in another way, I have determined that the reaction between sulfide and thiosulfate requires a temperature of at least 270° F. in order to produce elemental sulfur, and that the requirement for thiosulfate-free recycle water can be minimized by dividing the water-contacting step into two substeps, one using a substantially ammonium thiosulfate-free recycle water steam and the second operated at a temperature less than 270° F. using an ammonium thiosulfate-containing recycle water stream. Accordingly, it is an essential feature of my combination process that the hydrocarbon conversion section is interconnected with the waste water treating section at three points: the first being by means of the waste water stream from the water-contacting step of the hydrocarbon conversion process, the second being by means of a first recycle water stream which is substantially free of ammonium thiosulfate, and the third being by means of a second recycle water stream containing ammonium thiosulfate. The principal advantage of my combination process is the minimization of the amount of the substantially thiosulfate-free recycle water stream which must be produced at considerable expense in the waste water treating section either by a suitable distillation step or by a reduction step.

It is, accordingly, an object of the present invention to provide an improvement in a combination process for converting a hydrocarbon charge stock containing sulfurous and nitrogenous contaminants and for simultaneously recovering sulfur. A second object is to minimize the amount of an ammonium thiosulfate-free water stream that must be produced in a waste water treating process that is combined with a hydrocarbon conversion process of the type described herein in order to enable efficient operation with a closed water loop. Yet another object is to minimize the requirement for substantially ammonium thiosulfate-free water in a water-contacting step of a hydrocarbon conversion process wherein a water stream is used to prevent clogging of cooling means and lines with ammonium sulfide salts.

In one embodiment, the present invention is a combination process for converting a hydrocarbon charge stock containing sulfurous and nitrogenous contaminants and for simultaneously producing elemental sulfur where the amount of substantially ammonium thiosulfate-free water which is produced for recycle to the water-contacting step of the hydrocarbon conversion process is minimized. The first step of this combination process involves contacting the hydrocarbon charge stock and a hydrogen stream with a hydrocarbon conversion catalyst at conversion conditions sufficient to form an effluent stream containing substantially sulfur-free and nitrogen-free hydrocarbons, $NH_3$, $H_2S$ and hydrogen. A first recycle water stream which is substantially free of ammonium thiosulfate is, in the second step, admixed with the effluent stream from the first step to form a first mixture which is then cooled to a temperature not greater than 270° F. In the third step, a second recycle water stream containing ammonium thiosulate is admixed with the cooled first mixture to form a second mixture which is then cooled to a temperature of about 50–150° F. Thereafter, in the fourth step, the cooled second mixture is separated into a hydrogen-rich gas stream, a sulfur-free and hydrocarbon-rich liquid product stream and an aqueous waste stream containing $NH_4HS$ and

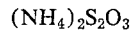

The fifth step involves treating the aqueous waste stream to produce elemental sulfur, a substantially ammonium thiosulfate-free water stream, and an ammonium thiosulfate-containing water stream. In the sixth step, at least a portion of the substantially ammonium thiosulfate-free water stream produced in the fifth step is recycled to the second step. And the final step involves recycling to the third step at least a portion of the ammonium thiosulfate-containing water stream produced in the fifth step.

In a second embodiment, the combination process of the present invention is the process as outlined above in the first embodiment wherein the fifth step comprises the substeps of: (1) catalytically threating the aqueous waste stream from the fourth step with oxygen at oxidizing conditions effective to produce an effluent stream containing $NH_4OH$, $(NH_4)_2S_2O_3$, and elemental sulfur or ammonium polysulfide; (2) separating sulfur and ammonia from the effluent stream from substep (1) to produce a water stream containing ammonium thiosulfate; and, (3) subjecting a portion of the water stream from substep (2) to reduction conditions effective to produce a substantially ammonium thiosulfate-free water stream.

In a third embodiment, the combination process of the present invention is a process as summerized above in the first embodiment wherein the fifth step comprises the substeps of: (1) contacting the aqueous waste stream from the fourth step and an oxygen stream with a solid catalyst at oxidizing conditions selected to produce an effluent stream containing ammonium polysulfide, $NH_4OH$ and $(NH_4)_2S_2O_3$; (2) subjecting the effluent stream from substep (1) to polysulfide decomposition conditions effective to produce an overhead vapor stream containing $NH_3$, $H_2S$ and an amount of $H_2O$ at least corresponding to the amount of water utilized in the second step and an aqueous bottom stream containing elemental sulfur and $(NH_4)_2S_2O_3$, (3) separating sulfur from the bottom stream produced in substep (2) to form a water stream containing ammonium thiosulfate; and, (4) condensing the overhead vapor stream from substep (2) to form an ammoniacal water stream which is substantially free of ammonium thiosulfate. It is to be noted that in this embodiment the ammonium thiosulfate-free recycle stream is produced from the water stream containing ammonium thiosulfate by increasing the amount of water vaporized in the decomposition step. An alternate procedure is to use a separate evaporation step on the water stream recovered from substep (2) or (3).

Other objects and embodiments are hereinafter disclosed in the following discussion of the input streams, the output streams, and the mechanics associated with each of the essential steps of the present invention.

As indicated above, the first step of the present invention involves the catalytic conversion of a hydrocarbon charge stock containing sulfurous and nitrogenous contaminants. The scope of this step is intended to embrace all catalytic petroleum processes which utilize hydrogen in the presence of a hydrocarbon conversion catalyst to react with sulfur and nitrogen compounds contained in the charge stock to produce, inter alia, $H_2S$, and $NH_3$. Generally, in these processes, the hydrocarbon charge stock containing the sulfurous and nitrogenous contaminants and a hydrogen stream are admixed and passed into contact with a hydrocarbon conversion catalyst comprising a metallic component selected from the metals and compounds of the metals of Group VI–B and Group VIII combined with a refractory inorganic oxide carrier material. This contacting is conducted at conversion conditions, including an elevated temperature and superatmospheric pressure, sufficient to produce an effluent stream containing substantially sulfur-free and nitrogen-free hydrocarbons, hydrogen, $H_2S$ and $NH_3$. One example of a preferred conversion process, included within the scope of this first step, is the process known in the art as hydrorefining, hydrotreating, or hydrodesulfurization. The principal purpose of a hydrorefining process is to desulfurize a hydrocarbon charge stock charged thereto by mild treatment with hydrogen which generally is selective enough to saturate olefinic-type hydrocarbons and to rupture carbon-nitrogen and carbon-sulfur bonds but is not severe enough to saturate aromatics. The charge to the hydrorefining process is typically a charge stock boiling in the range of about 100° F. to about 650° F., such as a gasoline boiling range charge stock or a kerosene boiling range charge stock or a heavy naphtha, which charge stock contains minor amounts of sulfurous and nitrogenous contaminants which are to be removed without causing any substantial amount of cracking or hydrocracking. The hydrorefining catalyst utilized is preferably disposed as a fixed bed in the conversion zone and typically comprises a metallic component selected from the transition metals and compounds of the transition metals of the Periodic Table. In particular, a preferred hydrorefining catalyst comprises an oxide or sulfide of a Group VIII metal, especially an iron group metal, mixed with an oxide or sulfide of a Group VI-B transition metal, especially molybdenum or tungsten. These metallic components are preferably combined with a carrier material which generally is characterized as a refractory inorganic oxide such as alumina, silica, zirconia, titania, etc. Mixtures of these refractory inorganic oxides are generally also utilized, especially mixtures of alumina and silica. Moreover, the carrier materials may be synthetically prepared or naturally occurring materials such as clays, bauxite, etc. Preferably, the carrier material is not made highly acidic. A preferred hydrorefining catalyst comprises cobalt oxide or sulfide and molybdenum oxide or sulfide combined with an alumina carrier material containing a minor amount of silica. Suitable conditions utilized in this first step in the hydrorefining mode are: a temperature in the range of about 700 to about 900° F., a pressure of about 100 to about 3000 p.s.i.g., a liquid hourly space velocity of about 1 to about 20 hr.$^{-1}$ and a hydrogen to oil ratio of about 500:1 to about 10,000:1 standard cubic feet of hydrogen per barrel of charge stock.

Another example of the type of conversion process which is preferably utilized as the first step of the present invention is a hydrocracking process. The principal objective of this type of process is not only to effect hydrogenation of the charge stock but also to effect selective cracking or hydrocracking. In general, the hydrocarbon charge stock, when the first step is hydrocracking, is a stock boiling above the gasoline range such as straight-run gas oil fractions, lubricating oil, coker gas oils, cycle oils, slurry oils, heavy recycle stocks, crude petroleum oils, reduced and/or topped crude oils, and the like charge stocks. Furthermore, these hydrocarbon charge stocks contain minor amounts of sulfurous and nitrogenous contaminants which may range from about 100 p.p.m. sulfur to 3 to 4 wt. percent sulfur or more; typically, the nitrogen concentration in this charge stock will be substantially less than the sulfur concentration except for some rare charge stocks, such as those derived from some types of shale oil, which contain more nitrogen than sulfur. The hydrocracking catalyst utilized typically comprises a metallic component selected from the metals and compounds of metals of Group VI-B and Group VIII combined with a refractory inorganic oxide. Particularly preferred metallic components comprise the oxides or sulfides of molybdenum and tungsten from Group VI-B and of iron, cobalt, nickel, platinum and palladium from Group VIII. The preferred refractory inorganic oxide carrier material is a composite of alumina and silica, although any of the refractory inorganic oxides mentioned hereinbefore may be utilized as a carrier material, if desired. Since it is desired that the catalyst possess a cracking function, the acid activity of these carrier materials may be further enhanced by the incorporation of small amounts of acidic materials such as fluorine and/or chlorine. In addition, in some cases it is advantageous to include within the carrier material an activated crystalline aluminosilicate, typically either in the hydrogen form or in a rare earth exchanged form. Preferred aluminosilicates are the Type X and Type Y forms of faujasite, although any other suitable aluminosilicate either naturally occurring or synthetically prepared may be utilized if desired. Conditions utilized in the first step when it is operated in the hydrocracking mode include: a temperature of about 500 to about 1000° F., a pressure in the range of about 300 to about 5000 p.s.i.g., a liquid hourly space velocity of about 0.5 to about 15.0 hr.$^{-1}$ and a hydrogen to oil ratio of about 1000:1 to about 20,000:1 standard cubic feet of hydrogen per barrel of oil.

Regardless of the details concerning the exact type of hydrocarbon conversion process utilized in the first step, the effluent stream recovered therefrom contains substantially sulfur-free and nitrogen-free hydrocarbons, $NH_3$, $H_2S$, and hydrogen. In accordance with the present invention, in the second step, this effluent stream is admixed with a first recycle water stream, obtained as hereinafter explained, which is substantially free of ammonium thiosulfate. The resulting mixture is then cooled, in any suitable first cooling means, to a temperature not greater than 270° F. and, more particularly, to a temperature of about 200–270° F. The amount of this first recycle stream charged to this second step is sufficient to prevent the deposition of ammonium sulfide salts in the cooling means utilized. In view of the relatively high temperatures involved in this first cooling step and the consequent high solubility of ammonium sulfide salts in water at these temperatures, a relatively small amount of water is required in this step; it is typically about 0.25 to about 5.0 gallons of water per hundred gallons of oil charged to the hydrocarbon conversion step.

In the third step of the present invention, the resulting partially cooled mixture recovered from the second step is admixed with a second recycle water stream, obtained as hereinafter indicated, which contains ammonium thiosulfate to form a second mixture and the resulting second mixture is cooled, in any suitable second cooling means, to a temperature of about 50° F. to about 150° F. The amount of this second recycle stream charged to this step is selected to be sufficient to prevent deposition of ammonium sulfide salts in the second cooling means, and it is generally about 5 to about 20 gallons of water per hundred gallons of oil charged to this step; however, in view of the fact that at these temperature conditions the danger of contaminating the oil product stream with elemental sulfur via the reaction between ammonium thiosulfate and sulfide is eliminated, the amount of this second water stream can in many cases be substantially above the minimum amount required to keep the second cooling means free of deposited salts. It is, of course, understood that instead of separate cooling means being used in each of the cooling steps described, a single cooling means may be utilized that has provision for inecting the two water streams in their proper places, that is the first recycle water stream is injected into the influent to the cooling means and the second recycle stream is injected into the cooling means at a point along the direction of flow of the stream being cooled through the cooling means where the temperature is not greater than 270° F.

In the fourth step of the present invention, the cooled mixture withdrawn from the third step is passed to a separating zone which is maintained at approximately the pressure employed in the hydrocarbon conversion step. In the separating zone, a three phase system is formed consisting of a hydrogen-rich gaseous phase, a hydrocarbon-rich liquid phase which is substantially free of elemental sulfur, and a waste water phase containing $NH_4HS$ and $(NH_4)_2S_2O_3$. The hydrogen-rich gaseous phase is then withdrawn from the zone and combined with a make-up hydrogen stream and the resulting mixture recycled to the hydrocarbon conversion step through a suitable compressive means. The hydrocarbon-rich liquid phase is typically withdrawn and passed to a suitable product recovery system which, generally for the type of hydrocarbon conversion processes within the scope of the present invention, comprises a suitable train of fractionating equipment designed to separate this hydrocarbon product stream into a series of desired products, some of which may be recycled. The aqueous phase formed in the separating zone is withdrawn to form an aqueous waste stream containing ammonuim hydrosulfide and ammonium thiosulfate.

The amount of $NH_4HS$ contained in this waste water stream may vary over a wide range up to the solubility limit of the sulfide salt in water. Typically, the amount of $NH_4HS$ is about 1.0 to about 10.0 wt. percent of the waste stream calculated as elemental sulfur. For example, a typical waste stream from a hydrocracking plant contains about 3 wt. percent NH$_4$HS calculated as elemental sulfur. Similarly, the amount of (NH$_4$)$_2$S$_2$O$_3$ may vary over a wide range; however, in most cases the amount of this salt will be relatively small. In addition, this waste water stream may in some cases contain excessive amount of NH$_3$, relative to the amount of H$_2$S absorbed therein, but very rarely will contain more H$_2$S than NH$_3$ because of the relatively low solubility of H$_2$S in an aqueous solution containing a ratio of dissolved H$_2$S and dissolved NH$_3$ greater than about 1:1.

Following this separation step, the waste water stream produced therein is passed to a treating step wherein it is catalytically treated with oxygen at oxidizing conditions selected to produce an aqueous effluent stream containing NH$_4$OH, (NH$_4$)$_2$S$_2$O$_3$ and elemental sulfur or ammonium polysulfide. In some cases, it is advantageous to remove dissolved or entrained oil contained in this waste stream by any suitable scrubbing operation prior to passing it to the treatment step; however, in most cases this waste stream is charged directly to the treating step.

The catalyst utilized in the treating step is a suitable solid catalyst that is capable of effecting conversion of the ammonium hydrosulfide salt contained in this waste stream. Two particularly preferred classes of catalyst for this step are metallic sulfides, particularly iron group metallic sulfides, and metal phthalocyanines. The metallic sulfide catalyst is selected from the group consisting of sulfides of nickel, cobalt, and iron, with nickel being especially preferred. Although it is possible to perform this step with a slurry of the metallic sulfide, it is preferred that the metallic sulfide be composited with a suitable carrier material. Examples of suitable carrier materials are: charcoal, such as wood charcoal, bone charcoal, etc. which may or may not be activated prior to use; refractory inorganic oxides such as alumina, silica, zirconia, kieselghur, bauxite, etc.; activated carbons such as those commercially available under the trade names of Norit, Nuchar, Darco, etc.; and other natural or synthetic highly porous inorganic carrier materials. The preferred carrier materials are alumina and activated charcoal or carbon and thus a preferred catalyst is nickel sulfide combined with alumina or activated carbon.

Another preferred catalyst for use in this treatment step is a metal phthalocyanine compound combined with a suitable carrier material. Particularly preferred metal phthalocyanine compounds include those of cobalt and vanadium. Other metal phthalocyanine compounds that may be used include those of iron, nickel, copper, molybdenum, manganese, tungsten, and the like. Moreover, any suitable derivative of the metal phthalocyanine compound may be employed including the sulfonated derivatives and the carboxylated derivatives. Any of the carrier materials previously mentioned in connection with the metallic sulfide catalyst can be utilized with the phthalocyanine compound; however, the preferred carrier material is activated carbon. Hence, a particularly preferred catalyst for use in the treatment steps comprises a cobalt or vanadium phthalocyanine sulfonate combined with an activated carbon carrier material. Additional details as to alternative carrier materials, methods of preparation, and the preferred amounts of catalytic components are given in the teachings of U.S. Patent No. 3,108,081 for these phthalocyanine catalysts.

Although this treatment step can be performed according to any of the methods taught in the art for contacting a liquid stream and a gas stream with a solid catalyst, the preferred system involves a fixed bed of the solid oxidizing catalyst disposed in a treatment zone. The waste water stream is then passed therethrough in either upward, radial, or downward flow and the oxygen stream is passed thereto in either concurrent or countercurrent flow relative to the aqueous waste stream. The preferred mode is downward concurrent flow. Because one of the products of this treatment step is elemental sulfur, there is a substantial catalyst contamination problem caused by the deposition of this elemental sulfur on the fixed bed of the catalyst. In general, in order to avoid sulfur deposition on the catalyst, it is preferred to operate this step in either of the two alternative modes. In the first mode, a sulfur solvent is admixed with the waste stream and charged to the treatment zone in order to effect removal of deposited sulfur from the solid catalyst.

Any suitable sulfur solvent may be utilized in this first mode provided that it is substantially inert to the conditions utilized in the treatment step and that it dissolves substantial quantities of sulfur. Examples of suitable sulfur solvents are: disulfide compounds such as carbon disulfide, methyldisulfide, ethyldisulfide, etc.; aromatic compounds such as benzene, toluene, xylene, ethylbenzene, etc.; aliphatic paraffins such as pentane, hexane, heptane, etc.; cyclic paraffins such as methylcyclopentane, cyclopentanes, cyclohexane, etc.; halide compounds such as carbon tetrachloride, methylene chloride, ethylene chloride, chloroform, tetrachloroethane, butyl chloride, propyl bromide, ethyldibromide, chlorobenzene, dichlorobenzene, etc.; and the like solvents. Moreover, mixtures of these solvents may be utilized if desired, and in particular a solvent which is particularly effective in an aromatic-rich reformate. In this mode, the preferred operation encompasses the utilization of a sulfur solvent that is substantially immiscible with the aqueous waste stream. Considering all of these requirements, one preferred sulfur solvent is selected from the group consisting of benzene, toluene, xylene, and mixtures thereof. Another group of preferred sulfur solvents are the halogenated hydrocarbons.

The amount of sulfur solvent utilized in this treatment step is a function of the net sulfur production for the particular waste stream, the activity and selectivity characteristics of the catalyst selected, and the solubility characteristics of the sulfur solvent. In general, the volumetric ratio of sulfur solvent to the waste water stream is selected such that there is at least enough sulfur solvent to carry away the net sulfur production from the oxidation reaction. As a practical matter, it is convenient to operate at a volumetric ratio substantially in excess of the minimum amount required to strip the sulfur from the catalyst; for example, for aqueous waste streams containing about 3 wt. percent ammonium hydrosulfide, a volumetric ratio of about 1 volume of sulfur solvent per volume of waste stream gives excellent results.

Accordingly, in the first mode of operation of the treatment step, a sulfur solvent and oxygen are charged in admixture with the aqueous waste stream to the treatment zone to produce an effluent stream comprising the sulfur solvent containing dissolved sulfur formed by the oxidation reaction, and water containing NH$_4$OH,

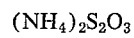

and, possibly, a minor amount of other oxides of sulfur. This effluent stream is passed to a separating zone where, in the preferred operation in which an immiscible sulfur solvent is utilized, a sulfur solvent phase separating from a treated aqueous phase containing NH$_4$OH and

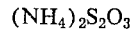

At least a portion of the sulfur solvent phase is then withdrawn from the separating zone and passed to a suitable sulfur recovery zone wherein at least a portion of the dissolved sulfur is removed therefrom by any of the methods known in the art such as crystallization, distillation, etc. A preferred procedure is to distill off sulfur solvent and recovery a slurry of molten sulfur from the bottoms of the sulfur recovery zone. The lean sulfur solvent recovered from this sulfur separation step can then be recycled to the treatment step. It is, of course, understood that it is not necessary to treat all of the sulfur solvent to remove sulfur therefrom; that is, it is only necessary to treat an amount of the rich sulfur solvent sufficient to recover the net sulfur production. In any event, an aqueous stream containing $NH_4OH$ and $(NH_4)_2S_2O_3$ is withdrawn from this separating zone, and passed to a stripping zone wherein at least a portion of the ammonia contained therein is removed to produce an aqueous stream containing $(NH_4)_2S_2O_3$. It is to be noted that in some cases it is advantageous to allow a relatively high concentration of $NH_4OH$ to remain in this last stream as the presence of $NH_4OH$ therein facilitates removal of additional amounts of $H_2S$ from the effluent stream from the hydrocarbon conversion step. In accordance with the present invention, a first portion of this last stream is passed to a reduction step, hereinafter described, in order to reduce the minor amount of ammonium thiosulfate contained therein to hydrogen sulfide and water, and a second portion of this stream is recycled directly to the third step of the present invention.

The second mode of operation of the treatment step comprises carefully regulating the amount of oxygen injected into the treatment zone so that oxygen is reacted in an amount less than the stoichiometric required to oxidize all of the ammonium hydrosulfide charged to this step to elemental sulfur. Hence, for this mode it is required that the amount of oxygen reacted be less than 0.50 mol of $O_2$ per mol of $NH_4HS$ and preferably about 0.25 to about 0.45 mol of $O_2$ per mol of $NH_4HS$ charged to this step. The exact value within this range is selected such that sufficient sulfide remains available to react with the net sulfur production—that is to say, this mode of operation requires that sufficient excess sulfide be available to form a polysulfide with the elemental sulfur which is the product of the primary oxidation reaction. Since one mol of sulfide will react with many mols of sulfur (i.e. about 4 mols of sulfur per mol of sulfide), it is generally only necessary that a small amount of sulfide remain unoxidized.

In this second mode, an aqueous effluent stream containing ammonium polysulfide, $(NH_4)_2S_2O_3$, $NH_4OH$ and a minor amount of other oxides of sulfur (principally the sulfite and sulfate) is withdrawn from the treatment step and passed to a polysulfide decomposition step. In the polysulfide decomposition step, the polysulfide compound is decomposed to yield $NH_3$, $H_2S$ and elemental sulfur. The preferred method for decomposing this polysulfide solution involves subjecting it, in a decomposition zone, to conditions including a temperature in the range of 100° F. to about 350° F. sufficient to form an overhead vapor stream containing $NH_3$, $H_2S$ and $H_2O$ and an aqueous bottom stream containing elemental sulfur and $$(NH_4)_2S_2O_3$$

In most cases, it is advantageous to use a rectifying column as the decomposition zone, and to accelerate the polysulfide decomposition reaction by stripping $H_2S$ and $NH_3$ from the polysulfide solution with the aid of a suitable upflowing, inert gas such as steam, air flue gas, etc., which is preferably injected into the lower region of the decomposition zone. Similarly, the upflowing vapors can be generated in the bottom of the decomposition zone by means such as a steam coil or a conventional reboiler. The temperature range given above refers to the bottom temperature of the column and the pressure utilized in conjunction therewith is selected to correspond closely to that associated with the vapor pressure of water at the desired bottom temperature. When the bottom region of the decomposition zone is maintained at a temperature below the melting point of sulfur, the bottom stream withdrawn therefrom will contain a slurry of sulfur particles. This bottom stream is then subjected, in a sulfur separation step, to any one of the techniques taught in the art for removing a solid from a liquid such as filtration, settling, etc. to remove the elemental sulfur therefrom. In the case where the bottom temperature of the decomposition zone is maintained above the melting point of sulfur, the bottom stream withdrawn therefrom will contain a dispersion of liquid sulfur which can then be separated by a suitable settling step. Regardless of how the elemental sulfur is separated from this bottom stream, the resulting water stream separated from the sulfur contains a minor amount of $(NH_4)_2S_2O_3$ and, in accordance with the present invention, a portion of this water stream is recycled to the third step as explained hereinbefore.

Regarding the overhead vapor stream from the polysulfide decomposition step, this stream can be subjected to a suitable scrubbing operation for removal of $H_2S$ and then condensed to yield an ammoniacal water stream which is substantially free of ammonium thiosulfate. In one embodiment associated with this second mode of operation of the treatment step, the amount of water which is taken overhead in the polysulfide decomposition zone is adjusted to provide an amount of this ammoniacal water stream which is at least sufficient to supply the recycle water stream for the second step of the present invention. In this embodiment, therefore, a portion of this ammoniacal water stream is recycled to this second step. Likewise, another portion of this ammoniacal water stream can be withdrawn from the system in order to remove the net ammonia and water therefrom. It is to be noted that in this embodiment, the principal advantage of the present invention is a substantial reduction in the amount of water that must be taken overhead in the polysulfide decomposition zone in order to provide sufficient water for recycle to the water-contacting step, relative to the amount of water that would have to be taken overhead in this zone if all of the water necessary for recycle was produced here.

In another embodiment associated with the second mode of operation of this treatment step, the amount of the overhead vapor stream from the polysulfide decomposition step is only sufficient to decompose the polysulfide and no extra amount of water is distilled overhead for purposes of recycle. In this embodiment, the overhead vapor stream is condensed and recycled to the treatment step. Once again, a portion of this condensate may be withdrawn from the system to remove the net ammonia and water. In this embodiment the thiosulfate-free recycle water stream necessary for the operation of the second step is produced by subjecting a portion of the ammonium thiosulfate-containing water stream recovered from the sulfur separation step to a reduction step as explained below.

An essential reactant for both modes of the treatment step is oxygen. This may be utilized in any suitable form either by itself or mixed with an inert gas. In general, it is preferred to utilize air to supply the necessary oxygen because of economic factors. In the second mode of operation of the treatment step, the amount of oxygen supplied and thereto is selected to result in the reaction of less than the stoichiometric amount required to oxidize or of the sulfide charged to the step to elemental sulfur. In the first mode of operation wherein a sulfur solvent is utilized, the amount of oxygen charged to the treatment step is sufficient to result in the reaction of about 0.5 to about 1.5 or more mols of oxygen per mol of sulfide charged to this step.

Regarding the conditions utilized in the treatment step, it is preferred for both modes of operation to utilize a temperature in the range of about 30° F. up to about 400° F. with a temperature of about 80° to about 300° F. giving best results. In fact, it is generally a good practice to operate at a relatively low temperature in order to minimize the formation of higher oxides of sulfur. The sulfide oxidation reaction is not too sensitive to pressure and, accordingly, a pressure which maintains the waste stream substantially in the liquid phase is generally adequate. In many cases it is preferred to operate at superatmospheric pressure in order to facilitate contact between the oxygen stream and the waste stream, and pressures of about 1 to about 75 p.s.i.g. are generally utilized.

Moreover, the liquid hourly space velocity (defined to be the volume charge rate of the aqueous waste stream per hour divided by the total volume of the catalyst bed) is preferably selected at from the range of about 0.5 to about 10.0 hrs.$^{-1}$.

As explained above, in the first mode of operation of the treatment step and in the second embodiment associated with the second mode of operation of the treatment step, it is a feature of the present invention that a portion of the water stream containing $(NH_4)_2S_2O_3$ recovered from the sulfur separation step is subjected to a reduction step effective to reduce the thiosulfate. The resulting substantially thiosulfate-free water stream is thereafter recycled to the second step of the present invention. This reduction step is preferably effected by contacting the thiosulfate-containing water stream and a hydrogen stream with a solid catalyst comprising an iron group metal component combined with a carrier material, at reduction conditions selected to reduce the thiosulfate to $NH_4HS$ and $H_2O$. This reduction step can be carried out in any suitable manner taught in the art for contacting a liquid stream and a gas stream with a solid catalyst. A particularly preferred method involves a fixed-bed catalyst system in which the catalyst is disposed in the reduction zone and the thiosulfate-containing water stream is passed therethrough in either upward, radial, or downward flow with a hydrogen stream being simultaneously introduced in either countercurrent or concurrent flow relative to the aqueous stream. In particular, a preferred embodiment involves downflow of the water stream and hydrogen stream through the reduction zone.

A feature of the reduction step in the preferred mode is the utilization of a solid catalyst comprising an iron group metallic component combined with a solid carrier material. Included within the scope of suitable reduction catalysts are the compounds and metals of iron, nickel and cobalt, with the oxides and sulfides of these metals being particularly preferred. Best results are obtained when the metallic component is cobalt sulfide. Regarding the carrier material for this metallic component, examples of suitable carrier materials are charcoals, such as wood charcoal, bone charcoal, etc. which charcoals, may be activated prior to use; refractory inorganic oxides, such as alumina, silica, zirconia, bauxite, etc.; activated carbons such as those commercially available under trade names of Norit, Nuchar, Darco, and other similar carbon materials familiar to those skilled in the art. The preferred carrier materials are alumina, particularly gamma-alumina, and activated carbon. Thus, the preferred reduction catalyst is cobalt sulfide combined with alumina or cobalt sulfide combined with activated carbon. In general, the iron group metallic component is preferably composited with the carrier material in an amount sufficient to result in the reduction catalyst containing about 0.1 to about 25 wt. percent of the iron group component calculated as the element metal. For the preferred cobalt sulfide catalyst, the amount of cobalt incorporated is preferably in an amount of sufficient to result in a reduction catalyst containing about 1 to about 15 wt. percent cobalt as cobalt sulfide.

An essential reactant for the reduction step is hydrogen. The hydrogen stream charged to the reduction step may be substantially pure hydrogen or a mixture of hydrogen with other relatively inert gases, such as a mixture of hydrogen with $C_1$ to $C_4$ hydrocarbons, a mixture of hydrogen and nitrogen, a mixture of hydrogen and carbon dioxide, a mixture of hydrogen and hydrogen sulfide, etc. A preferred source for the hydrogen stream is a portion of the hydrogen-rich gaseous phase withdrawn from the fourth step. The hydrogen is utilized in an amount equivalent to or greater than the stoichiometric amount required for the reduction of thiosulfate to sulfide. The stoichiometric amount is 4 mols of hydrogen per mol of thiosulfide. In general, it is preferred to operate at a hydrogen to thiosulfate mol ratio substantially greater than this stoichiometric amount. Hence, about 4 to about 50 mols of hydrogen per mol of the ammonium thiosulfate contained in the water stream charged to the reduction step is preferably used. It is understood that the unreacted hydrogen contained in the effluent of the reduction step of the present invention is preferably recycled to the second step of the present invention along with the substantially thiosulfate-free water stream although it is not essential to do so.

The conditions utilized in the reduction step are generally described as reduction conditions effecting conversion of ammonium thiosulfate to sulfide—either hydrogen sulfide or ammonium hydrosulfide. The temperature utilized is preferably selected from the range of about 200 to about 600° F. with best results obtained at approximately 300 to about 450° F. The pressure employed is typically a pressure which is sufficient to maintain the water stream containing ammonium thiosulfate in liquid phase. In general, it is preferred to operate at superatmospheric pressures and preferably a pressure of about 100 to about 3000 p.s.i.g. Moreover, it is preferred to use a liquid hourly space velocity (defined on the basis of the volume charge rate per hour of the water stream containing ammonium thiosulfate divided by the total volume of the reduction catalyst bed) ranging from about 0.5 to about 10.0 hr.$^{-1}$ with best results obtained at about 1.0 to about 3.0 hr.$^{-1}$.

In the preferred embodiment of the reduction step wherein the water stream containing ammonium thiosulfate and the hydrogen stream are concurrently contacted with the reduction catalyst, the effluent stream withdrawn from the reduction zone contains the sulfide product of the reduction reaction, a minor amount of unreacted thiosulfate, hydrogen, water and in some cases $NH_4OH$. If desired, the sulfide product of the reduction reaction may be stripped from the resulting effluent stream. More frequently, the minor amount of ammonium hydrosulfide produced by the reduction reaction is allowed to remain in the effluent stream recovered from the reduction step and the entire effluent stream is recycled to the second step of the present invention.

Having broadly characterized the essential steps comprising the combination process of the present invention, reference is now had to the attached drawing for a detailed explanation of a preferred flow scheme employed when a hydrocracking process is combined with a waste water treating process. The attached drawing is merely intended as a general representation of a preferred flow scheme, with no intent to give details about heaters, condensers, pumps, compressors, valves, process control equipment, etc., except where a knowledge of the use of these devices is essential to an understanding of the present invention or would not be self-evident to one skilled in the art. In addition, in order to provide a working example of a preferred mode of the present invention, the attached drawing is discussed with reference to a particular hydrocarbon charge stock and preferred catalysts for use in the various steps thereof.

Referring to the attached drawing, a light gas oil enters the combination process through line 1. This light gas oil is commingled with a cycle stock at the junction of line 15 and line 1, and with a recycle hydrogen stream at the junction of line 9 with line 1. The resulting mixture is then heated via a suitable heating means (not shown) to the desired conversion temperature and then passed into hydrocarbon conversion zone 2. An analysis of the light gas oil shows it to have the following properties: an API gravity at 60° F. of 25, an intial boiling point of 421° F., a 50% boiling point of 518° F., an end boiling point of 663° F., a sulfur content of 2.21 wt. percent, and a nitrogen content of 126 p.p.m. Hydrogen is supplied via line 9 at a rate corresponding to a hydrogen circulation rate of 10,000 standard cubic feet of hydrogen per barrel of oil charged to zone 2. The cycle stock which is being recycled via line 15 is a portion of the 400+ fraction of the product stream which is separated in product recovery system 13 as will be hereinafter explained.

The catalyst utilized in zone 2 comprises nickel sulfide combined with a carrier material containing silica and alumina in a weight ratio of about 3 parts silica per part of alumina. The amount of nickel sulfide in the catalyst is sufficient to result in the final catalyst containing about 5.0 wt. percent nickel. The catalyst is maintained within zone 2 as a fixed bed of 1/8 by 1/8 inch cylindrical pills. The conditions utilized in zone 2 are hydrocracking conditions which include a pressure of about 1500 p.s.i.g., a conversion temperature of about 600° F. and a liquid hourly space velocity of about 2.0 based on combined feed.

An effluent stream is withdrawn from zone 2 via line 3 and admixed with a first recycle water stream at the junction of line 29 with line 3 to form a first mixture of water and effluent stream. The resulting first mixture is passed into cooling means 4 wherein it is cooled to a temperature of about 250° F. The amount of the first recycle stream added to the effluent stream via line 29 is about 3 gallons of water per 100 gallons of oil contained in this effluent stream. The first recycle stream is substantially free of ammonium thiosulfate and is produced via a reduction step as will be explained below. Moreover, a minor amount of unreacted hydrogen is also injected into line 3 via line 29. This hydrogen results from the reduction step as is explained below. The resulting cooled first mixture is withdrawn from cooling means 4 via line 5 and admixed with a second recycle water stream at the junction of line 26 with line 5 to form a second mixture. This second recycle stream contains a minor amount of ammonium thiosulfate which, because of the relatively cool temperature maintained at the point of admixture with the first mixture does not react with the sulfide contained in the effluent stream to produce elemental sulfur. The second mixture is then passed into cooling means 6 wherein it is cooled to a temperature of about 100° F. The amount of water injected into line 5 via line 26 is about 10 gallons of water per 100 gallons of oil contained in the effluent stream.

The cooled second mixture is then passed via line 7 into first separating zone 8 wherein a three phase system is formed. The gaseous phase comprises hydrogen, hydrogen sulfide and a minor amount of light ends. The oil phase contains the hydrocarbon products of the hydrocarbon conversion step. The waste water phase contains about 3 wt. percent sulfur as ammonium hydrosulfide and about 1 wt. percent sulfur as ammonium thiosulfate. This separating zone is maintained at a temperature of about 100° F. and a pressure of about 1450 p.s.i.g.

The hydrogen-rich gas phase is withdrawn from zone 8 via line 9 and a portion of the resulting stream is passed via line 10 to the reduction step. The remaining portion is recycled via line 9 to the hydrocarbon conversion zone. Furthermore, a makeup hydrogen stream is injected into the recycle hydrogen stream via line 11. The oil phase from separating zone 8 is withdrawn via line 12 and passed to product recovery system 13. In this case, product recovery system 13 comprises a low pressure separating zone and a suitable train of fractionating means. In the low pressure separating zone the oil stream is flashed to a pressure of about 100 p.s.i.g. in order to strip out dissolved $H_2S$ from this stream. The resulting stripped oil stream is fractionated to recover a gasoline boiling range product stream and a cycle oil comprising the portion of the product stream boiling above 400° F. The gasoline product stream is recovered via line 14 and the cycle oil is recycled to zone 2 via line 15.

The waste water phase formed in zone 8 is withdrawn via line 16 and commingled with an air stream at the junction of line 16 with line 17. The resulting mixture of the waste water stream and air stream is passed via line 17 into oxidation zone 18.

Oxidation zone 18 contains a fixed bed of a solid catalyst comprising cobalt phthalocyanine monosulfonate combined with an activated carbon carrier material in an amount such that the catalyst contains about 0.5 wt. percent to 3 wt. percent of the phthalocyanine compound. The activated carbon granules used as the carrier material are in a size of 12–40 mesh. The waste water stream is charged to the oxidation zone at a liquid hourly space velocity of about 1.0 hr.$^{-1}$. The amount of air which is charged to this zone via line 17 is sufficient to react about 0.4 mol of oxygen per mol of sulfide contained in the water stream. The conditions utilized in zone 18 are: a temperature of about 140° F. at the inlet to this zone, an outlet temperature of about 185° F. and a pressure of about 5 p.s.i.g.

Following the oxidation step an aqueous effluent stream is withdrawn from zone 18 via line 19 and passed to second separating zone 20. This aqueous effluent stream contains ammonium polysulfide, $NH_4OH$, $(NH_4)_2S_2O_3$, $H_2S$, $N_2$ and unreacted $NH_4HS$. In zone 20, a gas phase comprising $N_2$, $H_2O$, $NH_3$ and $H_2S$ is separated from a liquid water phase containing ammonium polysulfide, $NH_4HS$, $NH_4OH$, and $(NH_4)_2S_2O_3$. The gas phase is withdrawn from zone 20 via line 21 and can be vented from the system or scrubbed with a suitable solvent to allow recycle to the oxidation step of the unreacted sulfide.

The liquid water phase from zone 20 is withdrawn via line 22 and charged to polysulfide decomposition zone 23. Zone 23 is a stripping column containing suitable gas-liquid contacting means. Heat is supplied to the bottom of this stripping column by means such as a steam coil or a reboiler. The bottom of this column is maintained at a temperature of about 280° F. and at a pressure of about 40 p.s.i.g. which is sufficient to decompose the polysulfide with formation of liquid sulfur and to produce an overhead vapor stream containing $NH_3$, $H_2S$ and $H_2O$ which is withdrawn via line 24. The rate of withdrawal of the bottom water stream from zone 23 is adjusted so that the liquid sulfur formed within this zone collects in a separated phase in a bottom region thereof. This liquid sulfur phase is then withdrawn via line 25 and constitutes a product stream from the system. The bottom water stream withdrawn from zone 23 via line 26 contains the net amount of ammonium thiosulfate present in the aqueous stream charged to zone 23 via line 22. The overhead vapor stream withdrawn from zone 23 via line 24 contains the net amount of ammonia charged to zone 23 and an amount of $H_2S$ corresponding to the sulfide present in the water stream charged to zone 23. This vapor stream may be subjected to a suitable scrubbing operation if desired to remove $H_2S$ therefrom with resulting recycle of the recovered $H_2S$ to the oxidation step.

A first portion of the bottom water stream from zone 23 is passed via line 26 to line 5 wherein it is used to remove ammonium hydrosulfide salts from cooling means 6 as previously explained. A second portion of this water stream is charged via line 26 and line 27 to reduction zone 28. Moreover, this second portion is commingled with a hydrogen stream, withdrawn from line 9 via line 10 at the junction of line 10 with line 27. The amount of hydrogen commingled with this water stream is sufficient to provide a mol ratio of about 40 mols of $H_2$ per mol of ammonium thiosulfate contained in this water stream.

Reduction zone 28 contains a reduction catalyst comprising cobalt sulfide compound with an activated carbon carrier material. The catalyst is utilized in a particle size of about 12 to 20 mesh and contains 2.3 wt. percent cobalt on an elemental basis. The reduction catalyst is maintained in zone 28 as a fixed bed, and the mixture of hydrogen and the thiosulfate-containing water stream are passed in downflow fashion over the catalyst. The conditions utilized in reduction zone 28 are a temperature of 400° F., a pressure of 300 p.s.i.g. and a liquid hourly space velocity of 1 hr. $^{-1}$.

An effluent stream is withdrawn from zone 28 via line 29 and comprises a mixture of unreacted hydrogen and a substantially thiosulfate-free water stream containing a minor amount of NH₄HS. The resulting effluent stream is cooled to a temperature of about 100° F. by means not shown and passed via line 29 into line 3 wherein it is admixed with the effluent stream from the hydrocarbon conversion step as previously explained.

The combination process is operated in the manner described for a hydrocracking catalyst life of about 20 barrels per barrel of catalyst and the hydrocarbon product stream recovered via line 14 remains substantially free of elemental sulfur indicating that there is no significant amount of reaction between the ammonium thiosulfate content in the second recycle stream and the hydrogen sulfide contained in the effluent stream from the hydrocracking step. Accordingly, the amount of thiosulfate-free water required for the purpose of removing ammonium sulfide salts from the effluent heat transfer equipment in the hydrocracking process is minimized by means of the split stream system outlined in the attached drawing.

I claim as my invention:

1. A combination process for converting a hydrocarbon charge stock containing sulfurous and nitrogenous contaminants and for simultaneously producing elemental sulfur, said process comprising the steps of:
   (a) contacting the hydrocarbon charge stock and a hydrogen stream with a hydrocarbon conversion catalyst at conversion conditions sufficient to form an effluent stream containing substantially sulfur-free and nitrogen-free hydrocarbons, $NH_3$, $H_2S$, and hydrogen;
   (b) admixing a first recycle water stream which is substantially free of ammonium thiosulfate with the effluent stream from step (a) to form a first mixture and cooling the first mixture to a temperature not greater than 270° F.;
   (c) admixing a second recycle water stream containing ammonium thiosulfate with the cooled first mixture from step (b) to form a second mixture and cooling the second mixture to a temperature of about 50 to about 150° F.;
   (d) separating the cooled second mixture from step (c) into a hydrogen-rich gas stream, a sulfur-free and hydrocarbon-rich liquid product stream, and a waste water stream containing $NH_4HS$ and $(NH_4)_2S_2O_3$;
   (e) treating the waste water stream from step (d) to produce elemental sulfur, a substantially ammonium thiosulfate-free water stream, and an ammonium thiosulfate-containing water stream;
   (f) recycling to step (b) at least a portion of the substantially ammonium thiosulfate-free water stream from step (e); and,
   (g) recycling to step (c) at least a portion of the ammonium thiosulfate-containing water stream from step (e).

2. A combination process as defined in claim 1 wherein said hydrocarbon conversion catalyst utilized in step (a) comprises a metallic component selected from the metals and compounds of the metals of Group VI-B or Group VIII combined with a refractory inorganic oxide carrier material.

3. A combination process as defined in claim 2 wherein said hydrocarbon charge stock boils above the gasoline range and said conversion conditions utilized in step (a) are hydrocracking conditions.

4. A combination process as defined in claim 2 wherein said hydrocarbon charge stock boils in the range of about 100° F. to about 650° F. wherein said conversion conditions utilized in step (a) are hydrorefining conditions.

5. A combination process as defined in claim 1 wherein step (e) comprises the substeps of:
   (1) catalytically treating the waste water stream from step (d) with oxygen at oxidizing conditions effective to produce an effluent stream containing $NH_4OH$, $(NH_4)_2S_2O_3$, and elemental sulfur or ammonium polysulfide;
   (2) separating sulfur and ammonia from the effluent stream from substep (1) to produce a water stream containing ammonium thiosulfate; and,
   (3) subjecting a portion of the water stream from substep (2) to reduction conditions effective to produce a substantially ammonium thiosulfate-free water stream.

6. A combination process as defined in claim 1 wherein step (e) comprises the substeps of:
   (1) contacting the waste water stream from step (d) and an oxygen stream with a solid catalyst at oxidizing conditions selected to produce an effluent stream containing ammonium polysulfide, $NH_4OH$, and $(NH_4)_2S_2O_3$;
   (2) subjecting the effluent stream from substep (1) to polysulfide decomposition conditions effective to produce an overhead vapor stream containing $NH_3$, $H_2S$, and an amount of $H_2O$ at least corresponding to the amount of water utilized in step (b) and an aqueous bottoms stream containing elemental sulfur and $(NH_4)_2S_2O_3$;
   (3) separating sulfur from the bottom stream produced in substep (2) to form a water stream containing ammonium thiosulfate; and,
   (4) condensing the overhead vapor stream from substep (2) to form an ammoniacal water stream which is substantially free of ammonium thiosulfate.

7. A combination process for converting a hydrocarbon charge stock containing sulfurous and nitrogenous contaminants and for simultaneously producing elemental sulfur, said combination process comprising the steps of:
   (a) contacting the hydrocarbon charge stock and a hydrogen stream with a hydrocarbon conversion catalyst at conversion conditions sufficient to form an effluent stream containing substantially sulfur-free and nitrogen-free hydrocarbons, $NH_3$, $H_2S$, and hydrogen;
   (b) admixing a first recycle water stream which is substantially free of ammonium thiosulfate with the effluent stream from step (a) to form a first mixture and cooling the first mixture to a temperature not greater than 270° F.;
   (c) admixing a second recycle water stream containing ammonium thiosulfate with the cooled first mixture from step (b) to form a second mixture and cooling the second mixture to a temperature of about 50 to about 150° F.;
   (d) separating the cooled second mixture from step (c) to form a hydrogen-rich gaseous stream, an elemental sulfur-free and hydrocarbon-rich liquid product stream, and an aqueous waste stream containing $NH_4HS$ and $(NH_4)_2S_2O_3$;
   (e) catalytically treating the aqueous waste stream from step (d) with oxygen at oxidizing conditions effective to produce an effluent stream containing $NH_4OH$, $(NH_4)_2S_2O_3$, and elemental sulfur or ammonium polysulfide;
   (f) separating sulfur and ammonia from the effluent stream from step (e) to produce a water stream containing $(NH_4)_2S_2O_3$;
   (g) catalytically treating a first portion of the water stream from step (f) with hydrogen at reduction conditions effective to form a substantially thiosulfate-free water stream;
   (h) recycling a second portion of the water stream from step (f) to step (c); and,
   (i) recycling at least a portion of the substantially thiosulfate-free water stream from step (g) to step (b).

8. A combination process as defined in claim 7 wherein step (e) comprises contacting the aqueous waste stream and oxygen with a phthalocyanine catalyst at oxidizing conditions effective to produce an effluent stream containing $NH_4OH$, $(NH_4)_2S_2O_3$, and elemental sulfur or ammonium polysulfide.

9. A combination process as defined in claim 7 wherein step (g) comprises contacting a first portion of the water stream from step (f) and a hydrogen stream with a reduction catalyst comprising an iron group metallic sulfide combined with a carrier material at reduction conditions effective to produce a substantially thiosulfate-free effluent stream containing $H_2$ and an aqueous solution of $NH_4HS$.

10. A combination process as defined in claim 9 wherein said reduction catalyst is cobalt sulfide combined with an activated carbon or alumina carrier material.

References Cited

UNITED STATES PATENTS

| | | | |
|---|---|---|---|
| 3,340,182 | 9/1967 | Berkman et al. | 23—181X |
| 3,423,180 | 1/1969 | Hoekstra | 23—224 |

OSCAR R. VERTIZ, Primary Examiner

G. O. PETERS, Assistant Examiner

U.S. Cl. X.R.

208—212, 216